(12) United States Patent
Krishnappa (10) Patent No.: US 8,984,308 B2
(45) Date of Patent: Mar. 17, 2015

(54) SYSTEM AND METHOD OF ADAPTIVE VOLTAGE SCALING

(71) Applicant: QUALCOMM Incorporated, San Diego, CA (US)

(72) Inventor: Madan Krishnappa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 13/692,735

(22) Filed: Dec. 3, 2012

(65) Prior Publication Data

US 2014/0157007 A1    Jun. 5, 2014

(51) Int. Cl.
| | |
|---|---|
| *G06F 1/00* | (2006.01) |
| *G06F 1/26* | (2006.01) |
| *G05F 1/10* | (2006.01) |
| *H02J 4/00* | (2006.01) |
| *G06F 1/28* | (2006.01) |
| *G06F 1/32* | (2006.01) |

(52) U.S. Cl.
CPC ... *H02J 4/00* (2013.01); *G06F 1/28* (2013.01); *G06F 1/3296* (2013.01)
USPC .......................................... 713/300; 327/540

(58) Field of Classification Search
CPC ............. G06F 1/28; G06F 1/3296; H02J 4/00
USPC .......................................... 713/300; 327/540
See application file for complete search history.

(56) References Cited

U.S. PATENT DOCUMENTS

| | | |
|---|---|---|
| 7,289,921 B1 | 10/2007 | Salmi et al. |
| 8,010,317 B1 | 8/2011 | Pennanen et al. |
| 8,051,312 B2 | 11/2011 | Foley |
| 2008/0307240 A1 | 12/2008 | Dahan et al. |
| 2011/0068858 A1 | 3/2011 | Chawla et al. |
| 2011/0181337 A1 | 7/2011 | Otsuga et al. |
| 2011/0291729 A1 | 12/2011 | Chan et al. |
| 2012/0023382 A1 | 1/2012 | Sandhu et al. |
| 2012/0075005 A1 | 3/2012 | Flores et al. |
| 2012/0218005 A1 | 8/2012 | Chua-Eoan et al. |

OTHER PUBLICATIONS

International Search Report and Written Opinion—PCT/US2013/071436—ISA/EPO—May 8, 2014.

*Primary Examiner* — Mark Connolly
(74) *Attorney, Agent, or Firm* — Paul S. Holdaway (57) ABSTRACT

A particular method includes, prior to issuing a recommendation by an adaptive voltage scaling (AVS) system, performing a first iteration of an AVS operation to sample characteristics of a semiconductor device to determine a first adjustment recommendation. The method further includes performing at least one additional iteration of the AVS operation to determine at least one additional adjustment iteration. When a threshold number of consecutive adjustment recommendations are consistent, the method includes issuing the recommendation by the AVS system.

46 Claims, 5 Drawing Sheets

SYSTEM AND METHOD OF ADAPTIVE VOLTAGE SCALING

I. FIELD

The present disclosure is generally related to adaptive voltage scaling at semiconductor devices.

II. DESCRIPTION OF RELATED ART

A semiconductor die may include multiple systems (e.g., cores) that may be selectively powered off when not in use to improve power consumption at the semiconductor die. An adaptive voltage scaling (AVS) system may be implemented on the semiconductor die to periodically monitor operating conditions and to issue recommendations to a voltage regulator (e.g., an external power management integrated circuit (PMIC)) to increase or decrease a supply voltage. When the voltage regulator has a relatively slow response time to an AVS recommendation, a next monitoring operation of the AVS may occur during a transient of the supply voltage as the supply voltage is being changed. As a result, the AVS controller may issue a next recommendation based on a voltage measured during the transient rather than after the supply voltage has settled to the reduced value, which may result in instability of the power supply.

III. SUMMARY

In a particular embodiment, an AVS system is configured to wait until the AVS system determines a threshold number of consistent adjustment recommendations based on data acquired from multiple sensors sampling information from a semiconductor device before issuing a recommendation to a voltage controller. The recommendation may be to modify an operational characteristic associated with a semiconductor device, such as a recommendation to increase a supply voltage of the semiconductor device. By waiting for a threshold number of consistent adjustment recommendations, the AVS system may avoid issuing the recommendation based on data acquired while the semiconductor device is in a transient state. Accordingly the AVS system may operate with increased stability.

In a particular embodiment, a method includes issuing a recommendation by an AVS system. Prior to issuing the recommendation, a first iteration of an AVS operation may be performed to sample characteristics of a semiconductor device to determine a first adjustment recommendation. At least one additional iteration of the AVS operation may also be performed to determine at least one additional adjustment recommendation. When the first adjustment recommendation and each of the at least one additional adjustment recommendations are consistent, the AVS system may issue a recommendation (e.g., a recommendation to increase or decrease power).

In another particular embodiment, an apparatus includes an AVS system comprising multiple sensors configured to sample characteristics of a semiconductor device. A controller may be coupled to the sensors to determine an adjustment recommendation for each iteration of an AVS operation that includes sampling the characteristics of the semiconductor device. The controller may be further configured to issue a recommendation (e.g., a recommendation to increase or decrease power) in response to a threshold number of consecutive adjustment recommendations being consistent.

In another particular embodiment, an apparatus includes a means for sampling characteristics of a semiconductor device. The apparatus further includes a means for determining an adjustment recommendation for each iteration of an AVS operation that includes sampling characteristics of the semiconductor device. The apparatus further includes a means for issuing a recommendation (e.g., a recommendation to increase or decrease power) in response to a threshold number of consecutive adjustment recommendations being consistent.

In another particular embodiment, a computer-readable storage device includes instructions that, when executed by a processor, cause the processor to issue a recommendation by an AVS system. The instructions are further executable by the processor to perform a first iteration of an AVS operation to sample characteristics of a semiconductor device to determine a first adjustment recommendation. The instructions are further executable by the processor to perform at least one additional iteration of the AVS operation to determine at least one additional adjustment recommendation. When the first adjustment recommendation and each of the at least one additional adjustment recommendations are consistent, the AVS system may issue a recommendation (e.g., a recommendation to increase or decrease power).

One particular advantage provided by at least one of the disclosed embodiments is that by delaying issuing recommendations until after a threshold number of consecutive iterations have resulted in consistent adjustment recommendations, the AVS system may avoid instability due to a sample period that occurs during a transition. Thus, reliability of the AVS system may be increased.

Other aspects, advantages, and features of the present disclosure will become apparent after review of the entire application, including the following sections: Brief Description of the Drawings, Detailed Description, and the Claims.

V. DETAILED DESCRIPTION

Figure 1:
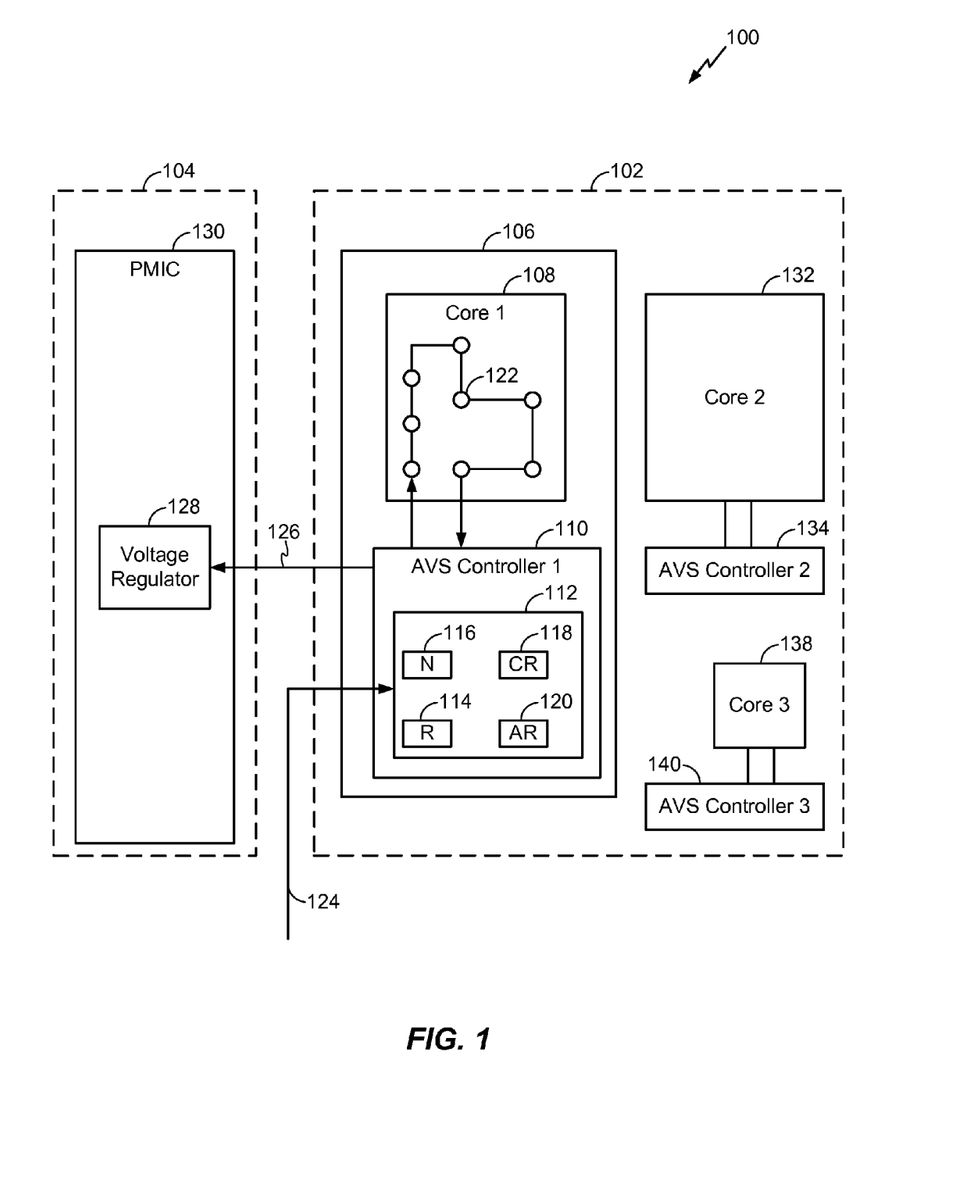
FIG. 1 is a diagram of a first embodiment of an adaptive voltage scaling system.

Referring to FIG. 1, a particular illustrative embodiment of a system 100 is shown. The system 100 may include one or more adaptive voltage scaling (AVS) systems, such as a representative AVS system 106, of a semiconductor device. The AVS system 106 may be configured to perform multiple iterations of an AVS operation and issue a recommendation 126 to a voltage regulator 128 to adjust a characteristic of a first circuit (Core 1) 108 of the semiconductor device. The system 100 may include one or more devices, which may be distributed across one or more semiconductor dies 102, 104.

The AVS system 106 may include a chain of one or more sensors 122 coupled to an AVS controller, such as a first AVS controller (AVS Controller 1) 110. The first AVS controller 110 may include at least one memory, for example, a memory 112, that may be configured to store values associated with the AVS system 106. The values may include an interval 114 between sampling periods, a threshold number 116 of consistent adjustment recommendations to issue a recommendation 126, a count of consistent adjustment recommendations 118, a most recent adjustment recommendation 120, or a combination thereof. The memory 112 may be programmable via an interface, such as an interface 124.

The AVS system 106 including the first AVS controller 110 and the sensors 122 may be programmable via the interface 124, to perform parallel sensor sampling or serial sensor sampling during each iteration of the AVS operation. When the sensors 122 are configured to perform parallel sensor sampling, the sensors 122 may sample characteristics of a first circuit 108 simultaneously and send results of the sampling (e.g., values corresponding to the sampled characteristics) along the chain of sensors 122. When the sensors 122 are configured to perform serial sensor sampling, the sensors 122 may wait to receive sampling results of a previous sensor before sampling a characteristic of the first circuit 108. Thus, a first time of a first sampling period of the serial sensor sampling may be greater than a second time of a second sample period of the parallel sensor sampling.

Multiple AVS systems may be implemented on a first semiconductor die 102. For example, the system 100 may include a second AVS system including a second AVS controller (AVS Controller 2) 134 coupled to a second circuit (Core 2) 132 and a third AVS system including a third AVS controller (AVS Controller 3) 140 coupled to a third circuit (Core 3) 138. Although three AVS controllers and their corresponding circuits are shown in FIG. 1, the system 100 may include more than three AVS controllers and their corresponding circuits or fewer than three AVS controllers and their corresponding circuits. The voltage regulator 128 may be implemented at a power management integrated circuit (PMIC) 130 on a second semiconductor die 104 that is distinct from the first semiconductor die 102. Alternatively, the voltage regulator 128 and the AVS system(s) may be implemented on a common die. In the embodiment illustrated in FIG. 1, the system 100 includes the voltage regulator 128. In other embodiments, the system 100 may also, or in the alternative, include other control systems configured to adjust other characteristics of the circuit(s), such as current.

The AVS system 106 may delay issuing a recommendation 126 to the voltage regulator 128 until after a threshold number 116 of consecutive iterations of an AVS operation have resulted in consistent adjustment recommendations. In a first example, the AVS system 106 may: sample the sensors 122 in series based on an input at the interface 124, determine an adjustment recommendation at the first AVS controller 110, store the adjustment recommendation in the memory 112 as the most recent adjustment recommendation 120, sample the sensors 122 in series again, determine another adjustment recommendation at the first AVS controller 110, and compare the current adjustment recommendation (e.g., an adjustment recommendation for a most recent sample that has not been stored as the most recent adjustment recommendation 120) to the most recent adjustment recommendation 120. When the current adjustment recommendation and the most recent adjustment recommendation 120 are not consistent, the first AVS controller 110 may set the count of consistent adjustment recommendations 118 to zero, store the current adjustment recommendation in the memory 112 as the most recent adjustment recommendation 120, and the AVS system 106 may sample the sensors 122 in series again. When the current adjustment recommendation and the most recent adjustment recommendation 120 are consistent, the first AVS controller 110 may increase the count of consistent adjustment recommendations 118 stored in the memory 112 by one. The first AVS controller 110 may compare the count of consistent adjustment recommendations 118 to the threshold number 116 stored in the memory 112. When the count of consistent adjustment recommendations 118 is not equal to the threshold number 116, the first AVS controller 110 may store the current adjustment recommendation in the memory 112 as the most recent adjustment recommendation 120 and the AVS system 106 may sample the sensors 122 in series again. When the count of consistent adjustment recommendations 118 is equal to the threshold number 116, the first AVS controller 110 may send a recommendation 126 to the voltage regulator 128, set the count of consistent adjustment recommendations 118 to zero, and store the current adjustment recommendation in the memory 112 as the most recent adjustment recommendation 120.

In a second example, the AVS system 106 may: sample the sensors 122 in parallel based on an input at the interface 124, determine an adjustment recommendation at the first AVS controller 110, store the adjustment recommendation in the memory 112 as the most recent adjustment recommendation 120, sample the sensors 122 in parallel again, determine another adjustment recommendation at the first AVS controller 110, and compare the current adjustment recommendation to the most recent adjustment recommendation 120. When the current adjustment recommendation and the most recent adjustment recommendation 120 are not consistent, the first AVS controller 110 may set the count of consistent adjustment recommendations 118 to zero, store the current adjustment recommendation in the memory 112 as the most recent adjustment recommendation 120, and the AVS system 106 may sample the sensors 122 in parallel again. When the current adjustment recommendation and the most recent adjustment recommendation 120 are consistent, the first AVS controller 110 may increase the count of consistent adjustment recommendations 118 stored in the memory 112 by one. The first AVS controller 110 may compare the count of consistent adjustment recommendations 118 to the threshold number 116 stored in the memory 112. When the count of consistent adjustment recommendations 118 is not equal to the threshold number 116, the first AVS controller 110 may store the current adjustment recommendation in the memory 112 as the most recent adjustment recommendation 120, and the AVS system 106 may sample the sensors 122 in parallel again. When the count of consistent adjustment recommendations 118 is equal to the threshold number 116, the first AVS controller 110 may send a recommendation 126 to the voltage regulator 128, set the count of consistent adjustment recommendations 118 to zero, and store the current adjustment recommendation in the memory 112 as the most recent adjustment recommendation 120. Accordingly, the AVS system 106 may avoid instability due to a sample period that occurs during a transition. Thus, reliability of the AVS system 106 may be increased.

Figure 2:
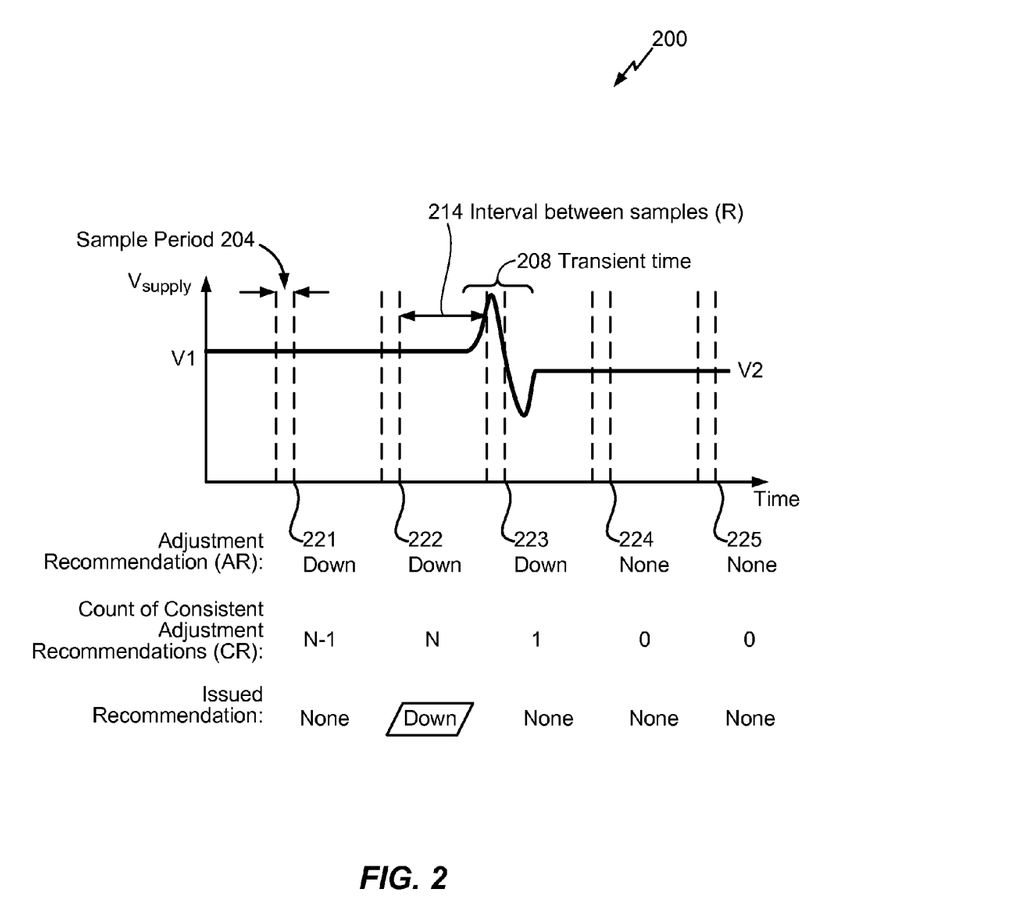
FIG. 2 is a timing diagram illustrating a sample recommendation of the adaptive voltage scaling system of FIG. 1.

FIG. 1 and FIG. 2 together illustrate a sample operation of an AVS system. FIG. 2 illustrates a graph 200 of supply voltage and multiple iterations 221-225 of an AVS operation that may be performed by the AVS system 106.

As illustrated in the graph 200, the supply voltage may have a value V1 when a first iteration 221 of the AVS operation is performed. In a particular example, the first iteration 221 includes sampling characteristics of the semiconductor device at the first circuit 108 by the sensors 122. Sample results may be provided to the first AVS controller 110 and an adjustment recommendation for the first iteration 221 may be generated by the first AVS controller 110 and stored at the memory 112. To illustrate, an adjustment recommendation may correspond to a voltage increase or a voltage decrease. As illustrated, the adjustment recommendation for the first iteration 221 is for a voltage decrease.

A most recent adjustment recommendation 120 may maintained by the first AVS controller 110 and may be stored at the memory 112. The most recent adjustment recommendation 120 may be used to determine whether the current adjustment recommendation is consistent with the most recent adjustment recommendation 120, thus indicating whether a count of consistent adjustment recommendations 118 for consecutive iterations will be increased or set to zero. After the count of consistent adjustment recommendations 118 is modified, the current adjustment recommendation may be stored at the memory 112 as the most recent adjustment recommendation 120.

The count of consistent adjustment recommendations 118 for consecutive iterations may be maintained by the first AVS controller 110, stored at the memory 112, and compared to a threshold number 116 "N", where N is an integer greater than one. In the example illustrated in FIG. 2, the adjustment recommendation for the first iteration 221 is an (N−1)st consecutive adjustment recommendation for a voltage decrease. Because the count of consistent consecutive adjustment recommendations 118 is less than the threshold number 116, the first AVS controller 110 does not issue a recommendation in response to the first iteration 221.

A second iteration 222 of the AVS operation may also result in an adjustment recommendation for a voltage decrease. Because the second iteration 222 results in the threshold number 116 Nth consecutive adjustment recommendation for a voltage decrease, the first AVS controller 110 issues a recommendation 126 to the voltage regulator 128 for a voltage decrease. After issuing the recommendation 126, the count of consistent adjustment recommendations 118 may be reset to 0.

In response to the recommendation 126, the voltage regulator 128 may lower the voltage supplied to the first circuit 108 from V1 to V2. A transition from V1 to V2 may be initiated after a delay at the voltage regulator 128, which may result in a transient time 208 during which the voltage may overshoot V1 and/or undershoot V2 before settling to a steady-state value of V2.

As illustrated, a third iteration 223 of the AVS operation may occur during the transient time 208. Because a sample period 204 of the third iteration 223 occurs during a voltage overshoot, the third iteration 223 results in an adjustment recommendation for a voltage decrease and the count of consistent adjustment recommendations 118 is increased from zero to 1. Because the count of consistent adjustment recommendations 118 is less than a threshold number 116 (N), the first AVS controller 110 does not issue a recommendation 126 to the voltage regulator 128.

A fourth iteration 224 of the AVS operation occurs after the voltage has settled to V2. Because V2 may be an appropriate voltage for the first circuit 108, the fourth iteration 224 may result in no adjustment recommendation. Because the most recent adjustment recommendation 120 recommended a voltage decrease, the count of consistent adjustment recommendations 118 may be reset to 0. Similarly, a fifth iteration 225 of the AVS operation results in no adjustment recommendation and therefore no recommendation 126 is issued by the first AVS controller 110 to the voltage regulator 128.

By delaying issuing of recommendations 126 to the voltage regulator 128 until after a threshold number 116 (N) of consecutive iterations have resulted in consistent adjustment recommendations, the first AVS controller 110 may avoid instability due to a sample period 204 that occurs during a voltage overshoot or undershoot during a transition, such as illustrated during the third iteration 223. The threshold number 116 may be a programmable value that may be programmable via an interface, such as the interface 124. Further, a time interval between samples 214 between each of the iterations 221-225 may be programmable via an interface, such as the interface 124 and may be selected to exceed the transient time 208 of a power change of the voltage regulator 128. The interface 124 may connect the first AVS controller 110 to a device on the same die 102 as the first AVS controller 110 or to a device that is not on the same die as the first AVS controller 110.

Each iteration 221-225 of the AVS operation may include the sensors 122 sampling one or more conditions and the first AVS controller 110 making a corresponding adjustment recommendation based at least partially on an operating condition, a temperature, a performance of the semiconductor device, or a combination thereof. For example, the operating condition may include a voltage measurement, and the sensors 122 may each determine a voltage. As another example, a performance measurement may include determining a clock frequency at a particular circuit (e.g., the first circuit 108), and the sensors 122 may each determine a frequency. The first AVS controller 110 may correspond to a processor configured to execute instructions to initiate and analyze data from the sensors 122, to generate adjustment recommendations, and to maintain the count of consistent adjustment recommendations 118.

Because delaying issuance of recommendations 126 to the voltage regulator 128 until after a threshold number 116 consecutive iterations of consistent adjustment recommendations may improve reliability of voltage adjustments, an area of the first circuit 108 may be reduced (e.g., a 5% area reduction). Area reduction of the first circuit 108 may be attained because greater accuracy of AVS decisions enables greater reliance by the first circuit 108 on access to voltage on an as-needed basis, increasing an ability to rely on the AVS system 106 to comply with design constraints.

Figure 3:
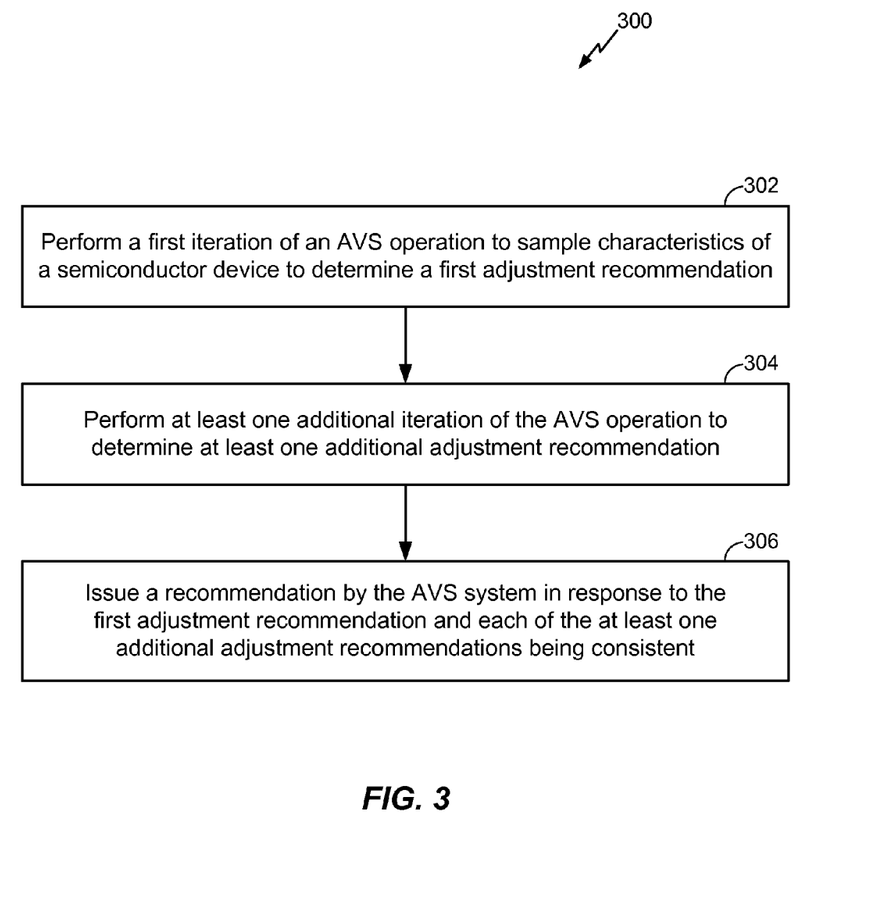
FIG. 3 is a flowchart illustrating a first embodiment of a method of adaptive voltage scaling.

FIG. 3 is a flowchart illustrating a first particular embodiment of a method 300 of issuing a recommendation from an AVS system to a voltage regulator in response to a number of adjustment recommendations being consistent. In one embodiment, the AVS system of the method 300 corresponds to the AVS system 106 of FIG. 1, and the voltage regulator of the method 300 corresponds to the voltage regulator 128 of FIG. 1. The method 300 includes, at 302, performing a first iteration of an AVS operation to sample characteristics of a semiconductor device to determine a first adjustment recommendation. For example, the AVS system 106 may sample the sensors 122 in series or in parallel based on an input at the interface 124, and determine an adjustment recommendation at the first AVS controller 110. The method 300 also includes, at 304, performing at least one additional iteration of the AVS operation to determine at least one additional adjustment recommendation. For example, the AVS system 106 may sample the sensors 122 again and determine at least one additional adjustment recommendation at the first AVS controller 110. The method 300 further includes, at 306, issuing a recommendation by the AVS system in response to the first adjustment recommendation and each of the at least one additional adjustment recommendations being consistent. For example, the AVS system 106 may compare the first adjustment recommendation and each of the at least one additional adjustment recommendations, determine that the adjustment recommendations are consistent, and issue a recommendation 126.

Thus, the method 300 enables the AVS system to delay issuing a recommendation until after a threshold number of consecutive iterations have resulted in consistent adjustment recommendations. Accordingly, the AVS system may avoid instability due to a sample period that occurs during a transition. Thus, reliability of the AVS system may be increased.

Figure 4:
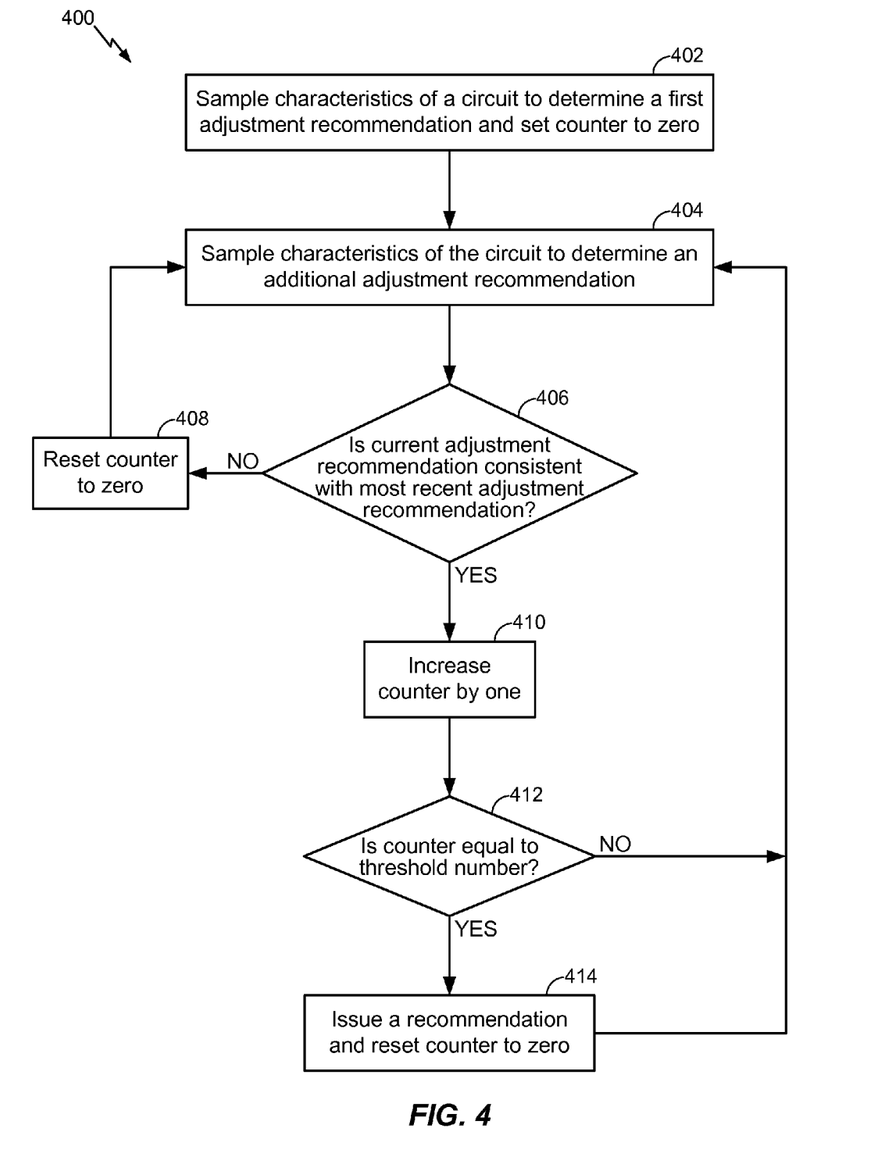
FIG. 4 is a flowchart illustrating a second embodiment of a method of adaptive voltage scaling.

FIG. 4 is a flowchart illustrating a second particular embodiment of a method 400 of issuing a recommendation from an AVS system to a voltage regulator in response to a number of adjustment recommendations being consistent. In one embodiment, the AVS system of the method 400 corresponds to the AVS system 106 of FIG. 1, and the voltage regulator of the method 400 corresponds to the voltage regulator 128 of FIG. 1. The method 400 includes, at 402, sampling characteristics of a circuit to determine a first adjustment recommendation and setting a counter that represents a count of consistent adjustment recommendations to zero. For example, the AVS system 106 may sample the sensors 122 in series or in parallel based on an input at the interface 124, determine an adjustment recommendation at the first AVS controller 110, and set the count of consistent adjustment recommendations 118 in the memory 112 to zero using the first AVS controller 110. The method 400 also includes saving the adjustment recommendation in the memory as the most recent adjustment recommendation. For example, the first AVS controller 110 may store the adjustment recommendation in the memory 112 as the most recent adjustment recommendation 120. The method 400 also includes, at 404, sampling characteristics of the device to determine an additional adjustment recommendation. For example, the AVS system 106 may sample the sensors 122 again and determine an additional adjustment recommendation at the first AVS controller 110.

The method 400 further includes, at 406, determining whether a current adjustment recommendation (e.g., an adjustment recommendation for a most recent sample that has not been stored as the most recent adjustment recommendation) is consistent with a most recent adjustment recommendation. For example, the first AVS controller 110 may compare the current adjustment recommendation with the most recent adjustment recommendation 120 stored in the memory 112. When the current adjustment recommendation is not consistent with the most recent adjustment recommendation, the method 400 may reset the counter to zero, at 408. For example, when the current adjustment recommendation is not consistent with the most recent adjustment recommendation 120, the first AVS controller 110 may set the count of consistent adjustment recommendations 118 in the memory 112 to zero. After resetting the counter to zero, the method 400 may include saving the current adjustment recommendation as the most recent adjustment recommendation and sampling characteristics of the device to determine an additional adjustment recommendation, at 404. For example, the first AVS controller 110 may store the current adjustment recommendation in the memory 112 as the most recent adjustment recommendation 120 and the AVS system 106 may sample the sensors 122 again and determine an additional adjustment recommendation at the first AVS controller 110. When the current adjustment recommendation is consistent with the most recent adjustment recommendation, the method 400 may increase the counter by one, at 410. For example, when the current adjustment recommendation is not consistent with the most recent adjustment recommendation 120, the first AVS controller 110 may increase the count of consistent adjustment recommendations 118 in the memory 112 by one.

After increasing the counter by one, at 410, the method 400 may include, at 412, determining whether the counter equals a threshold number. For example, the first AVS controller 110 may determine whether the count of consistent adjustment recommendations 118 is equal to the threshold number 116 stored in the memory 112. When the counter does not equal the threshold number, the method 400 may include saving the current adjustment recommendation as the most recent adjustment recommendation and sampling characteristics of the device to determine an additional adjustment recommendation, at 404. For example, the when the first AVS controller 110 determines that the count of consistent adjustment recommendations 118 is not equal to the threshold number 116, the first AVS controller 110 may store the current adjustment recommendation in the memory 112 as the most recent adjustment recommendation 120 and the AVS system 106 may sample the sensors 122 again and determine an additional adjustment recommendation at the first AVS controller 110. When the counter is equal to the threshold number, the method 400 may include issuing a recommendation and resetting the counter to zero, at 414. For example, the when the first AVS controller 110 determines that the count of consistent adjustment recommendations 118 is not equal to the threshold number 116, the AVS system 106 may issue the recommendation 126 and the first AVS controller may reset the count of consistent adjustment recommendations 118 to zero. After resetting the counter to zero, the method 400 may include saving the current adjustment recommendation as the most recent adjustment recommendation and sampling characteristics of the device to determine an additional adjustment recommendation, at 404. For example, after the first AVS controller resets the count of consistent adjustment recommendations 118 to zero, the first AVS controller 110 may store the current adjustment recommendation in the memory 112 as the most recent adjustment recommendation 120 and the AVS system 106 may sample the sensors 122 again and determine an additional adjustment recommendation at the first AVS controller 110.

Thus, the method 400 enables the AVS system to delay issuing a recommendation until after a threshold number of consecutive iterations have resulted in consistent adjustment recommendations. Accordingly, the AVS system may avoid instability due to a sample period that occurs during a transition. Thus, reliability of the AVS system may be increased.

The methods of FIGS. 3 and 4 may be implemented by various devices, such as a field-programmable gate array (FPGA) device, an application-specific integrated circuit (ASIC), a processing unit (e.g., a central processing unit (CPU)), a digital signal processor (DSP), a controller, another hardware device, a firmware device, or any combination thereof. As an example, the methods of FIGS. 3 and 4 can be performed by one or more processors that execute instructions, as further described with reference to FIG. 5.

Figure 5:
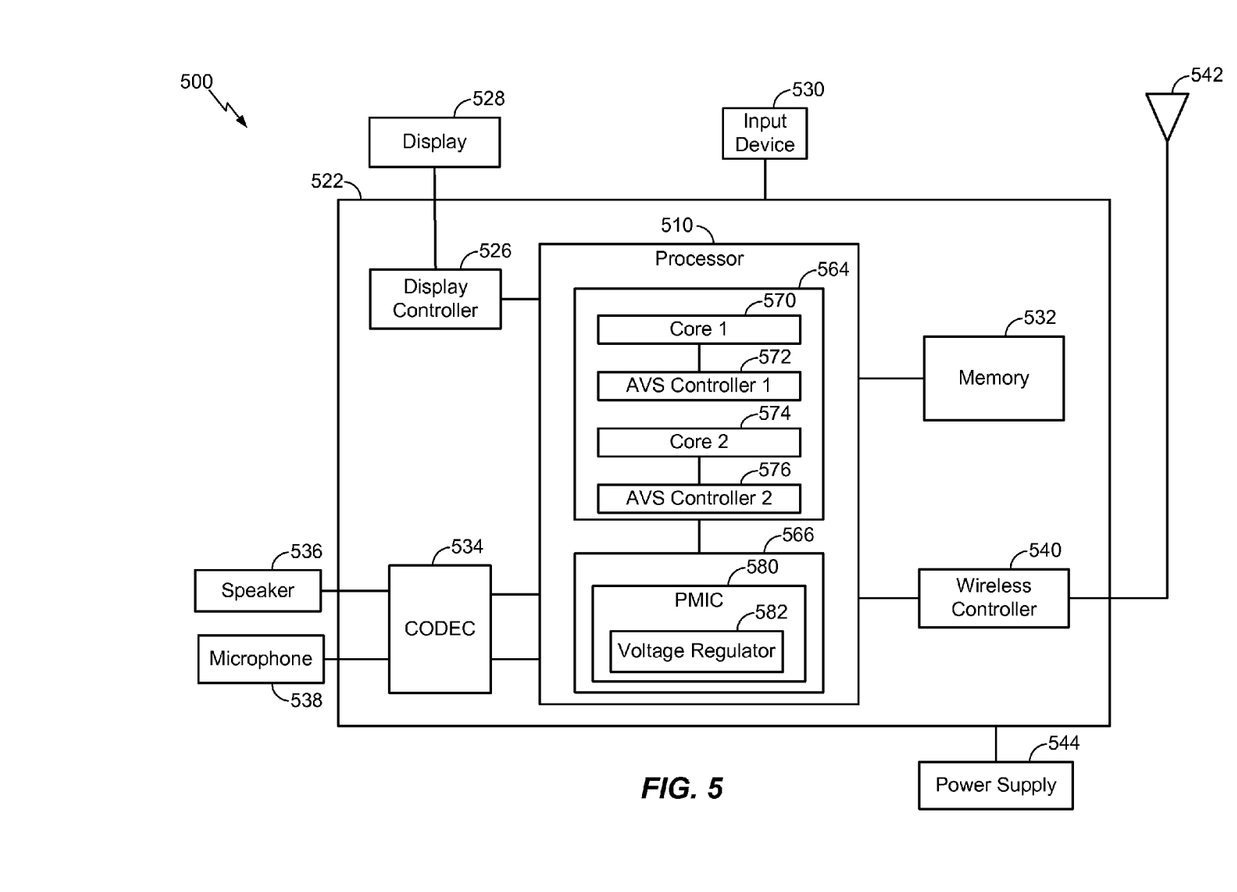
FIG. 5 is a block diagram of a communication device incorporating an adaptive voltage scaling system.

Referring to FIG. 5, a block diagram of a particular illustrative embodiment of a communication device incorporating an adaptive voltage scaling system is depicted and generally designated 500. The communication device 500, or components thereof, may include, implement, or be included within a device such as: a mobile station, an access point, a set top box, an entertainment unit, a navigation device, a communications device, a personal digital assistant (PDA), a fixed location data unit, a mobile location data unit, a mobile phone, a cellular phone, a computer, a portable computer, a desktop computer, a tablet, a monitor, a computer monitor, a television, a tuner, a radio, a satellite radio, a music player, a digital music player, a portable music player, a video player, a digital video player, a digital video disc (DVD) player, or a portable digital video player, each of which may be configured to execute one or more of the methods of FIGS. 3 and 4. In one embodiment, the communication device 500 includes the system 100 of FIG. 1.

The communication device 500 includes a processor 510, such as a digital signal processor (DSP), coupled to a memory 532. In a particular embodiment, the processor 510 includes a first die 564 and a second die 566. In a particular embodiment, the first die 564 includes a first circuit (Core 1) 570 connected to a first AVS controller (AVS Controller 1) 572 and a second circuit (Core 2) 574 connected to a second AVS controller (AVS Controller 2) 576. In a particular embodiment, the second die 566 includes a PMIC 580 and a voltage regulator 582. The processor 510 may be configured to execute the methods of FIGS. 3 and 4. The processor 510 may provide: at least one means for sampling characteristics of a semiconductor device, at least one means for determining an adjustment recommendation for each iteration of an AVS operation that includes sampling the characteristics, at least one means for issuing a recommendation in response to a threshold number of consecutive adjustment recommendations being consistent, a means for programming a memory component of the processor 510 (e.g., memory 532), a means for regulating voltage, or any combination thereof.

In the particular embodiment illustrated in FIG. 5, the communication device 500 includes a display controller 526 that is coupled to the processor 510 and to a display 528. A coder/decoder (CODEC) 534 can also be coupled to the processor 510. A speaker 536 and a microphone 538 can be coupled to the CODEC 534. A wireless controller 540 (e.g., a receiver, a transmitter, or a transceiver) can be coupled to the processor 510 and to an antenna 542.

In a particular embodiment, the processor 510, the display controller 526, the memory 532, the CODEC 534, and the wireless controller 540 are included at a system-in-package or system-on-chip device 522. In a particular embodiment, an input device 530 and a power supply 544 are coupled to the system-on-chip device 522. Moreover, in a particular embodiment, as illustrated in FIG. 5, the display 528, the input device 530, the speaker 536, the microphone 538, the antenna 542, and the power supply 544 are external to the system-on-chip device 522. However, each of the display 528, the input device 530, the speaker 536, the microphone 538, the antenna 542, and the power supply 544 can be coupled to a component of the system-on-chip device 522, such as an interface or a controller.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   prior to issuing a recommendation by an adaptive voltage scaling (AVS) system:
      performing a first iteration of an AVS operation to sample characteristics of a semiconductor device to determine a first adjustment recommendation; and
      performing at least one additional iteration of the AVS operation to determine at least one additional adjustment recommendation; and
   in response to the first adjustment recommendation and each of the at least one additional adjustment recommendations being consistent, issuing the recommendation by the AVS system.

2. The method of claim 1, wherein the recommendation is issued in response to the first adjustment recommendation and each of the at least one additional adjustment recommendations corresponding to a voltage increase.

3. The method of claim 1, wherein the recommendation is issued in response to the first adjustment recommendation and each of the at least one additional adjustment recommendations corresponding to a voltage decrease.

4. The method of claim 1, wherein the recommendation is issued in response to a threshold number of consecutive iterations having consistent adjustment recommendations, wherein the threshold number is a programmable integer value greater than one.

5. The method of claim 1, wherein a time interval between iterations is programmable.

6. The method of claim 1, wherein the AVS operation is performed by an AVS system that includes multiple sensors coupled to an AVS controller.

7. The method of claim 6, wherein the AVS system is programmable to select between sampling techniques including serial sensor sampling and parallel sensor sampling and to perform a selected sampling technique during each iteration.

8. The method of claim 1, wherein the recommendation is issued to a voltage regulator.

9. The method of claim 8, wherein the AVS operation is performed by an AVS system on a first die, and wherein the voltage regulator is implemented at a power management integrated circuit (PMIC) on a second die that is distinct from the first die.

10. The method of claim 9, wherein a time interval between iterations of the AVS operation is longer than a transient of a power change of the PMIC.

11. The method of claim 9, wherein multiple AVS systems are implemented on the first die.

12. The method of claim 1, wherein the first adjustment recommendation and the at least one additional adjustment recommendation are based on at least one of: an operating condition of the semiconductor device, a temperature of the semiconductor device, or a performance of the semiconductor device.

13. An apparatus comprising:
an adaptive voltage scaling (AVS) system comprising:
multiple sensors configured to sample characteristics of a semiconductor device; and
a controller coupled to the sensors and configured to determine an adjustment recommendation for each iteration of an AVS operation that includes sampling the characteristics,
wherein the controller is further configured to issue a recommendation in response to a threshold number of consecutive adjustment recommendations being consistent.

14. The apparatus of claim 13, wherein the recommendation is issued in response to the threshold number of consecutive adjustment recommendations indicating a voltage increase.

15. The apparatus of claim 13, wherein the recommendation is issued in response to the threshold number of consecutive adjustment recommendations indicating a voltage decrease.

16. The apparatus of claim 13, wherein the threshold number is a programmable integer value greater than one.

17. The apparatus of claim 13, wherein a time interval between iterations of the AVS operation is programmable.

18. The apparatus of claim 13, wherein the controller is programmable to select between sampling techniques including serial sensor sampling and parallel sensor sampling and to perform a selected sampling technique during each iteration.

19. The apparatus of claim 13, further comprising a voltage regulator, wherein the recommendation is issued to the voltage regulator.

20. The apparatus of claim 19, wherein the AVS system is implemented on a first die, and wherein the voltage regulator is implemented at a power management integrated circuit (PMIC) on a second die that is distinct from the first die.

21. The apparatus of claim 20, wherein a time interval between iterations of the AVS operation is longer than a transient of a power change of the PMIC.

22. The apparatus of claim 20, further comprising at least one additional AVS system implemented on the first die.

23. The apparatus of claim 13, wherein the adjustment recommendation is based on at least one of: an operating condition of the semiconductor device, a temperature of the semiconductor device, or a performance of the semiconductor device.

24. An apparatus comprising:
means for sampling characteristics of a semiconductor device;
means for determining an adjustment recommendation for each iteration of an adaptive voltage scaling (AVS) operation that includes sampling the characteristics; and
means for issuing a recommendation in response to a threshold number of consecutive adjustment recommendations being consistent.

25. The apparatus of claim 24, wherein the recommendation is issued in response to the threshold number of consecutive adjustment recommendations indicating a voltage increase.

26. The apparatus of claim 24, wherein the recommendation is issued in response to the threshold number of consecutive adjustment recommendations indicating a voltage decrease.

27. The apparatus of claim 24, wherein the threshold number is an integer value greater than one that is set via a means for programming.

28. The apparatus of claim 24, wherein a time interval between iterations is set via a means for programming.

29. The apparatus of claim 24, wherein the means for sampling is programmable to select between sampling techniques including serial sensor sampling and parallel sensor sampling and to perform a selected sampling technique during each iteration.

30. The apparatus of claim 24, further comprising means for regulating voltage, wherein the recommendation is issued to the means for regulating voltage.

31. The apparatus of claim 30, wherein the means for sampling, the means for determining, and the means for issuing are implemented on a first die, and wherein the means for regulating voltage is implemented at a power management integrated circuit (PMIC) on a second die that is distinct from the first die.

32. The apparatus of claim 31, wherein a time interval between iterations is longer than a transient of a power change of the PMIC.

33. The apparatus of claim 31, further comprising at least one additional means for sampling, at least one additional means for determining, and at least one additional means for issuing are implemented on the first die.

34. The apparatus of claim 24, wherein the adjustment recommendation is based on at least one of: an operating condition of the semiconductor device, a temperature of the semiconductor device, or a performance of the semiconductor device.

35. A computer-readable storage device comprising instructions that, when executed by a processor, cause the processor to:
prior to issuing a recommendation by an adaptive voltage scaling (AVS) system:
perform a first iteration of an AVS operation to sample characteristics of a semiconductor device to determine a first adjustment recommendation; and
perform at least one additional iteration of the AVS operation to determine at least one additional adjustment recommendation; and
in response to the first adjustment recommendation and each of the at least one additional adjustment recommendations being consistent, issue the recommendation by the AVS system.

36. The computer-readable storage device of claim 35, wherein the recommendation is issued in response to the first adjustment recommendation and each of the at least one additional adjustment recommendations corresponding to a voltage increase.

37. The computer-readable storage device of claim 35, wherein the recommendation is issued in response to the first adjustment recommendation and each of the at least one additional adjustment recommendations corresponding to a voltage decrease.

38. The computer-readable storage device of claim 35, wherein the recommendation is issued in response to a threshold number of consecutive iterations having consistent adjustment recommendations, wherein the threshold number is a programmable integer value greater than one.

39. The computer-readable storage device of claim 35, wherein a time interval between iterations is programmable.

40. The computer-readable storage device of claim 35, wherein the AVS operation is performed by an AVS system that includes multiple sensors coupled to an AVS controller.

41. The computer-readable storage device of claim 40, wherein the AVS system is programmable to select between sampling techniques including serial sensor sampling and parallel sensor sampling and to perform a selected sampling technique during each iteration.

42. The computer-readable storage device of claim 35, wherein the recommendation is issued to a voltage regulator.

43. The computer-readable storage device of claim 42, wherein the AVS operation is performed by an AVS system on a first die, and wherein the voltage regulator is implemented at a power management integrated circuit (PMIC) on a second die that is distinct from the first die.

44. The computer-readable storage device of claim 43, wherein a time interval between iterations of the AVS operation is longer than a transient of a power change of the PMIC.

45. The computer-readable storage device of claim 43, wherein multiple AVS systems are implemented on the first die.

46. The computer-readable storage device of claim 35, wherein the first adjustment recommendation and the at least one additional adjustment recommendation are based on at least one of: an operating condition of the semiconductor device, a temperature of the semiconductor device, or a performance of the semiconductor device.

\* \* \* \* \*